May 22, 1934.  S. E. SCHULTZ  1,960,091
RELAY PROTECTIVE SYSTEM
Filed March 18, 1931
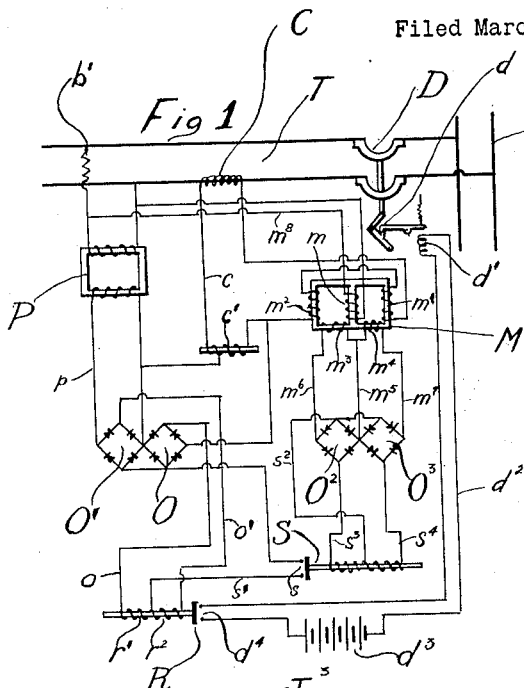
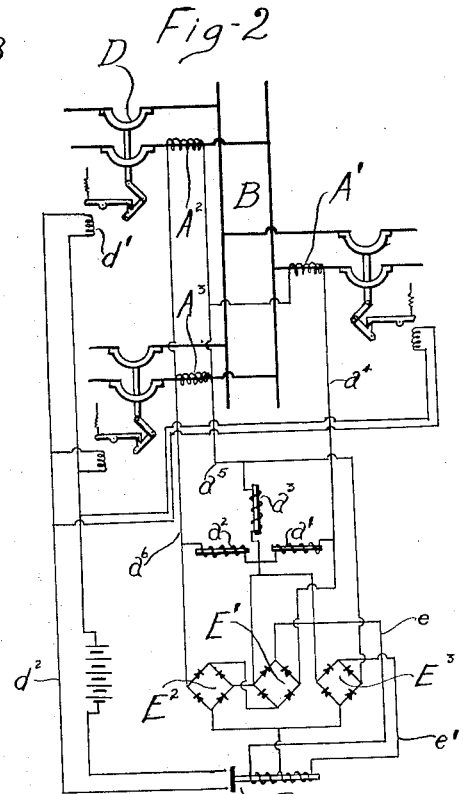
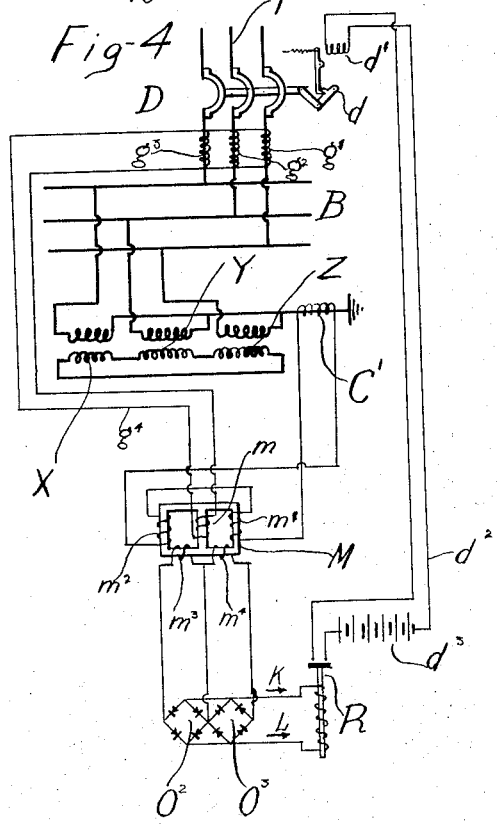
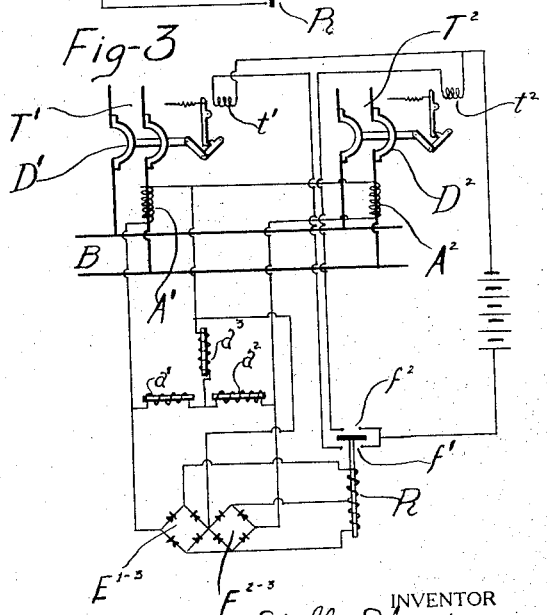
INVENTOR
Sol Eli Schultz
BY
Redding, Greeley, O'Shea & Campbell
ATTORNEYS Patented May 22, 1934

1,960,091

UNITED STATES PATENT OFFICE 1,960,091

RELAY PROTECTIVE SYSTEM

Solomon Eli Schultz, Bogota, N. J.

Application March 18, 1931, Serial No. 523,454

24 Claims. (Cl. 175—294)

The present invention relates to relay protective systems and embodies, more specifically, a relay system for protecting power circuits and isolating faulty circuits from other circuits connected thereto immediately upon the occurrence of a fault in such faulty circuits. More particularly, the invention relates to relay systems of the above character for use in connection with alternating current power systems and includes devices for deriving secondary currents which are responsive to the current and voltage conditions in an alternating current power system, these secondary currents being impressed upon a translating device from which a plurality of alternating currents are derived, these second named currents being rectified to effect a predetermined actuation. The resulting rectified currents are concurrently impressed upon an electro-responsive device to control the disconnecting mechanism for the alternating current power circuit and the disconnecting mechanism is thus adapted to be actuated upon a predetermined vectorial voltage and current condition in the circuit in accordance with the manner in which the second currents are combined and impressed as direct currents upon the electro-responsive device.

In the specific application of the invention, it is proposed to utilize the relay protective system to isolate a faulty circuit from an alternating current power system whether this faulty circuit be a bus or line circuit and there will therefore be described herein suggested applications of the invention for use in protecting several portions of a power circuit. In each of these systems, an electro-responsive disconnecting mechanism is utilized to disconnect a predetermined circuit from related circuits and this disconnecting device is controlled by a suitable electro-responsive mechanism upon which a plurality of rectified currents are impressed. In the specific forms shown, this electro-responsive mechanism for actuating the disconnecting device takes the form of a relay being adapted to be connected to a plurality of power sources (the sources of the several rectified currents) and thus this electro-responsive device is subjected to the influence of a plurality of actuating currents. Further description of the method and structure by means of which such currents are produced will be described hereinafter. The translating devices include reactors, resistors, impedances, auxiliary transformers, and rectifiers so connected that secondary currents are taken from the circuit to be protected and impressed upon rectifying devices to produce a plurality of rectified currents which vary in accordance with the respective secondary currents from which they are produced. Finally these rectified currents are impressed upon the electro-responsive device for operating the disconnecting means in the manner described more specifically hereinafter. With the foregoing in view, it will be seen that an object of the present invention comprises the provision of a relay protective system by means of which a faulty circuit may be disconnected from an electrical system immediately upon the occurrence of a fault, the isolation of such circuit constituting the protection of the remainder of the system.

A further object of the invention is to provide a relay protective system of the above character which is directional in actuation, that is, capable of responding to a predetermined direction of flow of power in a line to perform the desired protective function.

Further objects in the combination of devices described hereinafter to effect the specific results described will be apparent as the invention is described in greater detail and reference will now be made to the accompanying drawing, wherein:

Figure 1 is a diagrammatical representation of a relay protective system constructed in accordance with the present invention and illustrating a directional impedance type of relay.

Figure 2 is a similar representation of a system embodying the present invention and illustrating a differential type of relay.

Figure 3 is a similar representation of a system embodying the invention and illustrating a current balance type of relay.

Figure 4 is a similar representation of a system embodying the invention and illustrating a directional ground type of relay.

With specific reference to Figure 1, there is shown at T a transmission circuit which is connected to a bus B through a disconnecting device D. This disconnecting device is controlled by a tripping mechanism $d$ which, in turn, is controlled by a trip coil $d'$. A battery circuit $d^2$ which includes battery $d^3$ is connected to the trip coil $d'$ and is controlled by a relay R which closes the circuit $d^2$ at $d^4$.

Relay R is of such character that its speed of operation is a function of the impedance of the line measured from the fault to the point of relaying. This characteristic is obtained by impressing upon relay R two forces, one tending to close it and the other restraining it from closing. The force tending to close the relay is made proportional to the current in the transmission line and the restraining force proportional to the line voltage. Thus, when a fault occurs, the restraining force is overcome and the relay R is closed. To derive a current from the line T which is proportional to the current in the line, a current transformer C is provided, this transformer being connected by a circuit $c$ to a reactor $c'$ and a transformer M. The voltage drop of the reactor $c'$ is impressed across a rectifier O which thus supplies a direct current proportional to the current in the transmission line to the left hand portion $r'$ of the relay R through a circuit $o$. This current tends to close the relay R and such tendency is restrained by a force responsive to the voltage in the transmission line and derived from a potential transformer P which is connected to rectifier O' by means of a circuit $p$. Rectifier O' supplies current to the right hand coil $r^2$ of the relay R through a circuit $o'$ and thus a restraining force is exerted upon the relay R which is responsive to the voltage in the transmission line.

Relay R is thus subjected to two opposed direct currents and since its speed of operation may be made proportional to the net force tending to close it, the following general equation applies.

$S = I - E$, wherein, $S$ = speed of relay operation $I$ = current in the transmission line $E$ = voltage of the line which represents the voltage drop from the point of fault to the point of relaying.

It will be seen that the above equation bears no relationship to the impedance of the line and modification of the above described circuits must be effected in order that they may be related to the impedance. This is accomplished by so designing the cores of transformer P and reactor $c'$ that they become saturated at extremely low values of flux and produce, through rectifiers O and O', direct currents which are proportional to the logarithmic functions of the current and voltage in the transmission line T. Under this condition the resulting speed of relay operation may be, in general, represented by the following equation.

$$S = \log I - \log E$$

$$S = \log \frac{I}{E} = \log \frac{1}{Z}$$

wherein $Z$ = the impedance of the line measured from the point of relaying to the fault. The other terms of the above equation are identical to those used in the previous equation.

In order that the primary circuit of potential transformer P may be maintained substantially constant while at the same time providing it with a logarithmic characteristic, it is necessary to insert an impedance $b'$ in this circuit. The foregoing system would result in the operation of relay R as an impedance relay to trip the breaker D regardless of whether the fault occurs on the line side or the bus side of the breaker. In actual practice, it is usually necessary to control the relay R in such manner that it will operate only when the fault occurs on the line side of the breaker or disconnecting device D. To impart this characteristic to the system, a second relay S is provided having contacts $s$ in the circuit $s'$ of the relay R. This relay is adapted to respond in the event that the fault occurs on the line side of the breaker or disconnecting device D. In the event, however, that the fault occurs on the bus side of the breaker, the relay S remains inoperative and thus prevents the operation of relay R.

Should the fault occur on the line side of the breaker D, power will flow outward from the bus B over the line T while, if the fault occurs on the bus side of the breaker, power will flow inward to the bus over the line T. Relay S therefore is simply a power directional relay controlling the relay R by virtue of its contacts $s$ and its circuit $s'$. Relay S is operated by a translating device comprising a three leg auxiliary transformer M and rectifiers $O^2$ and $O^3$.

It will be seen that current from the current transformer C flows through coil $m'$ on the right hand outer coil of the three leg transformer M and through the left hand outer coil $m^2$ in an opposite direction. This gives rise to a magnetic flux traversing the top, bottom, and two outer legs of the transformer M with no flux flowing through the middle leg. Rectifier coils $m^3$, $m^4$ are thus excited equally and produce through rectifiers $O^2$ and $O^3$, respectively, equal and oppositely acting direct currents in the coils of relay S. Wire $s^2$ connects the rectifiers to the coil of relay S and wires $s^3$ and $s^4$ connect the respective rectifiers $O^2$ and $O^3$ to such coil. The rectifier coils of transformer M are connected to the common A. C. point of the rectifiers by a wire $m^5$ while the outer points of the rectifiers are connected to the respective coils by wires $m^6$ and $m^7$.

The coil $m$ on the middle leg of the transformer M is connected, by a circuit $m^8$ to the primary coil of the potential transformer P thus connecting the transformer coil $m$ directly across the transmission line. Neglecting the effect of variations in power factor which, for the purpose of this description, may be ignored, the magnetic flux from coil $m$ will, depending upon the direction of power flow over the line T, add to or detract from that produced by the coil $m^2$ in energizing coil $m^3$; and for the same direction of power flow will detract or add to the flux produced by coil $m'$ in energizing coil $m^4$. Hence for one direction of power flow coil $m^3$ is energized by a larger magnetic flux than coil $m^4$ and for the other direction of power flow the reverse is true. It will thus be seen that the direct current from rectifier $O^2$ is greater or less than that from rectifier $O^3$, depending upon the direction of flow of power over the line T. If the flow of power is away from the bus B, the direct current from rectifier $O^2$ is greater than that from the rectifier $O^3$ while if the flow of power is in the reverse direction, such current is less than the current from rectifier $O^3$.

Assuming that rectifier $O^2$ tends to operate the relay and that rectifier $O^3$ tends to oppose its operation, then for the direction of power flow away from the bus B the effect of the direct current from rectifier $O^2$ will predominate and will close the relay S. With power flowing in the opposite direction, rectifier $O^3$ will produce a greater direct current than rectifier $O^2$ and the relay will be restrained from operation. The resulting relay action may be summed up generally by the following equation.

$F = (\bar{I} + \bar{E}) - (\bar{I} - \bar{E})$ wherein, $\bar{I}$ = vectorial representation of the current in the line T $\bar{E}$ = vectorial representation of the voltage in the line T $F$ = magnitude of the force operating the relay S.

From the foregoing, it is apparent that the net force operating the relay S is the arithmetical difference between one quantity representing the vectorial sum of the current and voltage of the line and another quantity representing the vectorial difference of the current and voltage of the line.

In Figure 2, a diagrammatic representation is made of the manner in which the invention may be utilized to afford differential protection. This protection, in the system shown in Figure 2, is placed around the bus B in such fashion that, upon the occurrence of a fault therein, the relay R is actuated to close its contacts and energize the circuit $d^2$ for the disconnecting devices for each transmission line circuit. These disconnecting devices are identified by the reference character D and are equal in number to the lines to be protected. Coils $d'$ are provided, as in the system shown in Figure 1, for actuating the disconnecting mechanism. The translating device in this system includes reactors $a'$, $a^2$, $a^3$ and the rectifiers $E'$, $E^2$, and $E^3$. Current transformers $A'$, $A^2$, and $A^3$ are connected across the reactors by means of wires $a^4$, $a^5$, $a^6$, these wires also connecting the reactors to the rectifiers. The connections of the current transformers $A'$, $A^2$, and $A^3$ are in accordance with standard practice for differential protection which is based upon the principle that the vectorial sum of the incoming currents at a common junction of circuits is always equal to the vectorial sum of the outgoing currents except under fault conditions.

As shown in Figure 2, current transformers $A^2$ and $A^3$ are so connected that their vectorial sum is impressed through reactor $a^2$, while the current from the current transformer $A'$ is impressed through the reactor $a'$. With connections shown and with no fault on the bus B, the current through reactor $a'$ will be exactly equal and opposite to that flowing in the reactor $a^2$. Therefore no current will flow through the reactor $a^3$ which connects the junction of reactors $a'$ and $a^2$ with the common portion of the current transformer circuits. The reactor $a^3$ carries the "differential" current which can flow only upon the occurrence of a bus fault.

A voltage drop across reactor $a'$ is impressed across the rectifier $E'$, the voltage drop across reactance $A^2$ is impressed across $E^2$, and the drop across reactor $a^3$ is impressed across rectifier $E^3$. The direct current sides of the rectifiers $E'$ and $E^2$ are connected in series to energize the left hand portion of the relay R through a circuit $e$. This connection normally produces a restraining action to oppose operation of the relay R. The rectified current from $E^3$ is impressed across the right hand portion of the relay winding through circuit $e'$ and produces a force tending to actuate the relay to cause the same to close. Under normal conditions, the unidirectional potential across the rectifier $E^3$ is zero while that across the rectifiers $E'$ and $E^2$ is a finite value. Hence the relay is normally inoperative. Upon the occurrence of a fault on the bus B, a differential unidirectional voltage is produced across the rectifier $E^3$ which is so proportioned as a percentage differential effect as to overcome the restraining force of the rectifiers $E'$ and $E^2$ and thus trip the relay R. The point at which the relay R is actuated is that at which the current in the reactor $a^3$ exceeds a predetermined percentage of the current in the reactor $a'$ or $a^2$.

Figure 3 illustrates a system wherein the invention is applied to the protection of parallel feeders utilizing the effect of balanced currents to render the relay inoperative under normal conditions. Unbalanced currents, caused by the occurrence of a fault, are utilized to operate selectively the relay in tripping a faulty feeder upon the occurrence of a fault in one of the two parallel lines. $T'$ and $T^2$ indicate two parallel lines which are assumed to be of the same length and impedance. Normally, therefore, equal currents will flow over the two lines. Should a fault occur on either of these lines while the other remains unaffected a much greater current will flow over the faulty line than over the normal one. Current balance protection can thus be secured by connecting relay R in such fashion that its contacts $f'$ are closed if the line $T'$ carries more current than the line $T^2$, thus energizing trip coil $t'$ and operating the circuit breaker $D'$ to disconnect the line $T'$ from the bus B, thus clearing the fault on line $T'$. In a similar fashion, the relay R is adapted to close its contacts $f^2$ upon the occurrence of a fault in the line $T^2$. The contact $f^2$ energizes coil $t^2$ to actuate the breaker $D^2$ similar to the fashion in which breaker $D'$ is actuated.

The translating device which actuates the relay R comprises reactors $a'$, $a^2$ and $a^3$ and rectifiers $E^{1-3}$ and $E^{2-3}$. The operation of the system, in combination with the current transformers $A'$, and $A^2$ is as follows. Current transformer $A'$ is connected with reactor $a'$ while current transformer $A^2$ is connected with the reactor $a^2$, the instantaneous polarities of these transformers being such that the instantaneous polarities produce a circulating current which flows through the circuit including the current transformer $A'$, reactor $a'$, reactor $a^2$, and current transformer $A^2$. Under normal conditions, the currents flowing through the reactors $a'$ and $a^2$ are equal and no current flows through the "unbalance" reactor $a^3$. This reactor connects the junction of $a'$ and $a^2$, to the common side of the current transformer circuit. Normally, therefore, the unidirectional voltage across rectifier $E^{1-3}$ which is energized by the voltage drop across reactors $a'$ $a^3$ is equal to that across the rectifier $E^{2-3}$ which is energized by the voltage drop across the reactors $a^2$, $a^3$. Rectifier $E^{1-3}$ tends to operate relay R to close the contacts $f'$, while the rectifier $E^{2-3}$ tends to operate the relay to close the contacts $f^2$. Since these effects are opposite and normally equal, the relay R is maintained in a state of balance until a fault occurs. Should a fault occur on the line $T'$ the voltage drop across reactors $a'$ and $a^3$ would be greater than that across the reactors $a^2$ and $a^3$ and the rectifier $E^{1-3}$ would deliver more energy to the relay R than the rectifier $E^{2-3}$. A balanced condition would thus no longer prevail and the relay would operate to close its contacts $f'$, thus tripping the breaker $D'$ and isolating line $T'$. In a similar fashion a fault on the line $T^2$ would cause the contacts $f^2$ of the relay to be closed and the breaker $D^2$ would thus be actuated, isolating the line $T^2$.

The system shown in Figure 4 illustrates the application of the present invention to a directional ground type of protection for a three phase system, the relay utilized in this system operating in a similar fashion to that described in connection with the circuit shown in Figure 1 except that instead of potential and current being utilized to impart the directional characteristic to the relay, the residual or neutral current from the line is used in combination with the neutral current from a grounding transformer. These transformers are connected Y on the bus or primary side and delta on the secondary side.

The neutral of the primary is grounded and provides the necessary connection to energize the coils $m'$ and $m^2$ of the three leg transformer M. A current transformer C' is connected in the ground connection to provide this current and the coil $m$ of the transformer M is energized by current transformer coils $g'$, $g^2$ and $g^3$, connected in parallel in a circuit $g^4$ which includes the transformer coil $m$.

The connections shown provide protection to the line $T^3$, the directional feature being so provided that the relay R is operative when the ground fault occurs on the line side of the breaker D but remains inoperative for all other conditions. This is accomplished by coordinating the effect of the ground fault current flowing in the line $T^3$ with that in the grounding transformer neutral. The translating device, in this instance, comprises the three leg transformer M and the rectifiers $O^2$ and $O^3$. The neutral fault current from the line $T^3$ is derived from the combination of current transformers $g'$, $g^2$, $g^3$. This current actuates coil $m$ of the middle leg of the transformer M. The current in the neutral connection of the grounding transformer bank is derived from the current transformer C' and is impressed in the coils $m'$ and $m^2$ of the transformer M. The resulting action of coils $m$, $m'$, $m^2$ is such that coil $m^3$ is energized by a greater magnetic flux than coil $m^4$ if a ground fault occurs on the line side of breaker D and by lesser magnetic flux if the ground fault occurs on the bus side of the breaker D. Coil $m^3$ is connected to the rectifier $O^2$ and coil $m^4$ to the rectifier $O^3$. These rectifiers are so connected that the rectified current circulates between them and current flows through the relay R only when an unbalance occurs. Relay R is connected across rectifiers $O^2$ and $O^3$ and if current through rectifier $O^2$ is greater than that through $O^3$, a direct current proportional to this difference will flow through the relay R in the direction indicated by the arrow L. Likewise if rectifier $O^3$ produces a greater current than the rectifier $O^2$, the direction of current flow through the relay R will be in the opposite direction as indicated by the arrow K. By polarizing relay R so that it will be operative if the current flow therein is in the direction of the arrow L and inoperative if the current flow is in the reverse direction, its operation will be effective only upon the occurrence of a ground fault on the line side of the breaker D. Such operation will effect the closing of its contacts and the energization of the trip coil $d'$ to open the circuit breaker or disconnecting device D.

I claim as my invention:

1. Means for protecting a transmission line comprising an electro-responsive means, means to produce a plurality of alternating currents from the line, the relationship of such currents to each other being dependent upon conditions in the line, a translating device the functioning of which is dependent upon the alternating currents to produce a plurality of other alternating currents, means to rectify the last named alternating currents, and means to energize the electro-responsive device by the rectified currents.

2. Means for protecting a transmission line comprising an electro-responsive means, means to produce a plurality of alternating currents from the line, the relationship of such currents to each other being dependent upon conditions in the line a translating device the functioning of which is dependent upon the alternating currents to produce a plurality of other alternating currents, means to rectify the last named alternating currents, and means to combine the rectified currents to oppose each other, said means being adapted to energize the electro-responsive device.

3. Means for protecting a transmission line comprising an electro-responsive means, means to produce a plurality of alternating currents from the line, the relationship of such currents to each other being dependent upon conditions in the line, a translating device the functioning of which is dependent upon the alternating currents to produce a plurality of other alternating currents, means to rectify the last named alternating currents, means to cause one of the rectified currents to tend to energize the electro-responsive means, and means to cause the other of the rectified currents to oppose energization of the electro-responsive means.

4. Means for protecting a transmission line comprising an electro-responsive means, means to produce a plurality of alternating currents from the line, the relationship of such currents to each other being dependent upon conditions in the line, means energized by the currents to produce a plurality of other alternating currents by the mutual and concurrent action of the first currents, means to rectify the other currents, and means to energize the electro-responsive device by the rectified currents.

5. Means for protecting a transmission line comprising an electro-responsive means, means to produce a plurality of alternating currents from the line, a translating device energized by the currents to produce a plurality of other alternating currents and to vary a combined characteristic of the currents in accordance with varying power directional conditions in the line, means to rectify the last named currents, and means to energize the electro-responsive means by the rectified currents upon a predetermined power directional condition in the line.

6. Means for protecting a transmission line comprising an electro-responsive means, means to produce a plurality of alternating currents from the line, a translating device energized by the currents to produce a plurality of other alternating currents and to vary a combined characteristic of the currents in accordance with varying power directional conditions in the line, means to rectify the last named currents, means to energize the electro-responsive means by the rectified currents upon a predetermined condition in the line, and means to control the last named means by the proper directional condition in the line.

7. Means for protecting a transmission line comprising an electro-responsive means, means to produce a plurality of alternating currents from the line, means to vary a combined characteristic of the currents in accordance with varying line conditions to energize the electro-responsive means, means for producing a plurality of alternating currents from the line, a translating device energized by the last named currents to produce a plurality of other alternating currents for producing a normal condition in response to a normal directional power condition in the transmission line and an abnormal condition in response to a change in direction of power flow in the transmission line, means to rectify the other alternating currents, and means energized by the rectified currents to control the electro-responsive actuating means.

8. Means for protecting a transmission line comprising an electro-responsive means, current and voltage transformers connected to the line, a rectifying device for producing direct currents proportional to the currents from the transformers, means to energize the electro-responsive device from the rectifying device, means for producing a plurality of alternating currents from the line, a translating device for producing a normal condition in response to a normal directional power condition in the transmission line and an abnormal condition in response to a change in direction of power flow in the transmission line, and means energized by the translating device to control the electro-responsive actuating means.

9. Means for protecting a transmission line comprising an electro-responsive means, current and voltage transformers connected to the line, a rectifying device for producing direct current proportional to the currents from the transformers, means to energize the electro-responsive device from the rectifying device, controlling means for the energizing means, current and voltage transformers connected to the line, a translating device energized by the last named transformers to produce normal currents in response to a normal direction of power flow in the line and abnormal currents upon a reversal of power flow therein, a rectifier to produce direct currents proportional to the last named currents, and means to actuate the controlling means by the last named currents.

10. Means for protecting a transmission line comprising an electro-responsive means, current and voltage transformers connected to the line, a rectifying device for producing direct current proportional to the currents from the transformers, means to energize the electro-responsive device from the rectifying device, controlling means for the energizing means, a transformer having a plurality of legs having primary coils energized by one of the first named transformers to generate a flux in the yoke including such legs, an additional leg having a coil energized by the other of the first named transformers, secondary coils on the yoke between the additional leg and the first named legs, rectifying devices energized by the secondary coils, and means to energize the controlling device by current from the rectifying devices.

11. Means for protecting a transmission line comprising an electro-responsive means, current and voltage transformers connected to the line, a rectifying device for producing direct current proportonal to the currents from the transformers, means to energize the electro-responsive device from the rectifying device, controlling means for the energizing means including a relay, a transformer having a plurality of legs having primary coils energized by one of the first named transformers to generate a flux in the yoke including such legs, an additional leg having a coil energized by the other of the first named transformers, secondary coils on the yoke between the additional leg and the first named legs, rectifying devices energized by the secondary coils, and means to energize the relay normally by current from the last named rectifying devices to prevent actuation thereof and by current from the last named rectifying devices to energize the same upon reversal of power flow in the transmission line.

12. A protective device for a transmission line of a Y-connected system comprising an electro-responsive means, a ground connection for the Y-connected line, a transformer connected to the line, a transformer connected to the ground connection, a translating device for rectifying currents from the transformers, and means for impressing the rectified currents on the electro-responsive means.

13. A protective device for a Y-connected polyphase transmission line comprising an electro-responsive means, a ground connection for the Y-connected line, a transformer connected to the ground connection, transformers connected to the phase wires of the line, a multileg transformer having a coil energized by the ground connection transformer, a coil energized by the phase wire transformers, rectifying devices separately energized by the transformer, and means to energize the electro-responsive means by the rectifying devices.

14. A protective device for a Y-connected polyphase transmission line comprising an electro-responsive means, a ground connection for the Y-connected line, a transformer connected to the ground connection, transformers connected to the phase wires of the line, a three leg transformer having the coils on its outer legs energized by current from the ground connection, means to energize the middle leg by current from the phase transformers, independent secondary coils between the middle and outer legs of the three leg transformer, rectifying devices connected to the secondary coils, and means to energize the electro-responsive means by current from the rectifying devices.

15. A protective device for a poly-phase transmission line comprising an electro-responsive means, a ground transformer connected in Y to the wires of the line and to the ground, a current transformer connected to the ground connection, transformers connected to the wires of the line, a three leg transformer having its outer coils connected to the ground wire transformer, means to energize the middle coil by current from the transmission wire transformers in parallel, independent secondary coils between the middle and outer legs of the three leg transformer, rectifying devices connected to the secondary coils, and means to combine the currents from the rectifying devices to energize the electro-responsive means.

16. A protective device, a bus and a plurality of lines or feeders connected thereto comprising electro-responsive means, transformers connected to each feeder, impedances connected across each transformer, rectifying devices connected across each impedance, and means to energize the electro-responsive means by the rectifiers.

17. A protective device for a bus and a plurality of lines or feeders connected thereto comprising electro-responsive means, current transformers connected to each feeder, reactances connected to a plurality of the transformers and connected together at a common point, a reactance connected between the common point and each of the transformers, rectifiers connected across each reactance, means to energize the electro-responsive means by current from the rectifier of the last named reactance, and means to energize the electro-responsive means by current from the rectifiers of the first reactances.

18. A protective device for a bus and a plurality of lines or feeders connected thereto comprising electro-responsive means, current transformers connected to each feeder, two reactances connected to the transformers and connected together at a common point, a reactance connected between the common point and the respective transformers, two rectifiers connected across the two reactances, respectively, a rectifier connected across the last named reactance, means to combine the currents from the first rectifiers to energize the electro-responsive means, and means to energize the electro-responsive means by current from the last named rectifier.

19. A protective device for a bus and a plurality of lines or feeders connected thereto comprising transformers connected to each feeder, reactances connected to the respective transformers and connected together, a reactance connected to the first reactances and to the said transformers, rectifiers connected across the reactances, and selective electro-responsive means actuated by the rectifiers.

20. A protective device for a bus and a plurality of lines or feeders connected thereto comprising transformers connected to each feeder, reactances connected to the respective transformers and connected together, a reactance connected to the first reactances and to the said transformers, rectifiers connected across certain of the reactances, a connection between the rectifiers and the last named reactance, and selective electro-responsive means actuated by the rectifiers.

21. A protective device for a bus and a plurality of lines or feeders connected thereto comprising transformers connected to each feeder, reactances connected to each transformer and connected together at a common point, a reactance connected between the common point and all of the transformers, rectifiers connected to each reactance and connected together at a common point, a connection from the last named common point to the common connection of the reactances to the last named reactance, a selective electro-responsive device connected at a common point to the rectifiers, and to the respective rectifiers to energize the same selectively by current from the respective rectifiers.

22. A protective device for a bus and a plurality of lines or feeders connected thereto comprising transformers connected to each feeder, reactances connected to each transformer and connected together at a common point, a reactance connected between the common point and all of the transformers, rectifiers connected to certain of the reactances and connected together at a common point, a connection from the last named common point to the common connection of the reactances through the last named reactance, a selective electro-responsive device connected at a common point to the rectifiers and to the respective rectifiers to energize the same selectively by current from the respective rectifiers, and means energized by the last named device to disconnect a plurality of the feeders from the bus.

23. Means for protecting a transmission line comprising an electro-responsive means, means to produce a plurality of alternating currents from the line, the relationship in magnitude and phase displacement of such currents to each other being dependent upon conditions in the line, a translating device, the functioning of which is dependent upon the alternating currents to produce a plurality of other alternating currents, means to rectify the last named alternating currents, and means to energize the electro-responsive device by the rectified currents.

24. Means for protecting a transmission line comprising an electro-responsive means, means to produce a plurality of alternating currents of the same frequency and from the same power source from the line, the relationship of such currents to each other being dependent upon conditions in the line, a translating device, the function of which is dependent upon the alternating currents to produce a plurality of other alternating currents, means to rectify the last named alternating currents, and means to energize the electro-responsive device by the rectified currents.

SOL ELI SCHULTZ.